United States Patent
Chongoushian

(10) Patent No.: US 12,356,350 B2
(45) Date of Patent: Jul. 8, 2025

(54) MULTINETTING TIME SYNCHRONIZATION

(71) Applicant: BAE SYSTEMS Information and Electronic Systems Integration Inc., Nashua, NH (US)

(72) Inventor: John H. Chongoushian, Emerson, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 65 days.

(21) Appl. No.: 18/492,844

(22) Filed: Oct. 24, 2023

(65) Prior Publication Data

US 2025/0133514 A1    Apr. 24, 2025

(51) Int. Cl.
    *H04W 56/00*    (2009.01)

(52) U.S. Cl.
    CPC ............... *H04W 56/0015* (2013.01)

(58) Field of Classification Search
    CPC .................................. H04W 56/0015
    See application file for complete search history.

(56) References Cited

U.S. PATENT DOCUMENTS

| | | | |
|---|---|---|---|
| 6,618,455 B1 * | 9/2003 | Maeda ............ | H04J 3/0688 713/400 |
| 9,936,499 B2 | 4/2018 | Chongoushian | |
| 2016/0262151 A1 | 9/2016 | Chongoushian et al. | |
| 2019/0196770 A1 * | 6/2019 | Fryman ............. | A61M 5/142 |
| 2022/0295431 A1 | 9/2022 | Ly-Gagnon et al. | |

OTHER PUBLICATIONS

Northrop Grumman , "Understanding Voice and Data Link Networking", Dec. 2014 [Retrieved from the Internet on: Dec. 16, 2024 (Dec. 16, 2024)] [URL: https://dl.icdst.org/ pdfs/files/e90d3 7 a9b93e2e607 2063 20ea07 d7 ad2.pdf].
International Search Report, PCT/US2024/052520, mailed Jan. 21, 2025, 10 pages.

* cited by examiner

*Primary Examiner* — Ayanah S George
(74) *Attorney, Agent, or Firm* — Maine Cernota & Curran; Scott J. Asmus

(57) ABSTRACT

A method is disclosed of efficiently synchronizing time bases of multi-netting network nodes. A first node transmits a synchronizing request on a subnet associated with the highest time quality in its source table, then simultaneously monitors that subnet and up to three additional subnets associated with lower time qualities in its source table. If the first node does not receive a response, it transmits the request on the subnet associated with the next highest time quality in its source table. A second node simultaneously monitors the subnet associated with its time quality and a plurality of subnets associate with consecutively higher time qualities. Upon receiving the synchronization request, it responds on the subnet associated with its time quality. The disclosed method is fully compatible with networks that include single-netting nodes, and can be implemented by a JTRS node exchanging RTT messages on a Link 16 network.

20 Claims, 9 Drawing Sheets

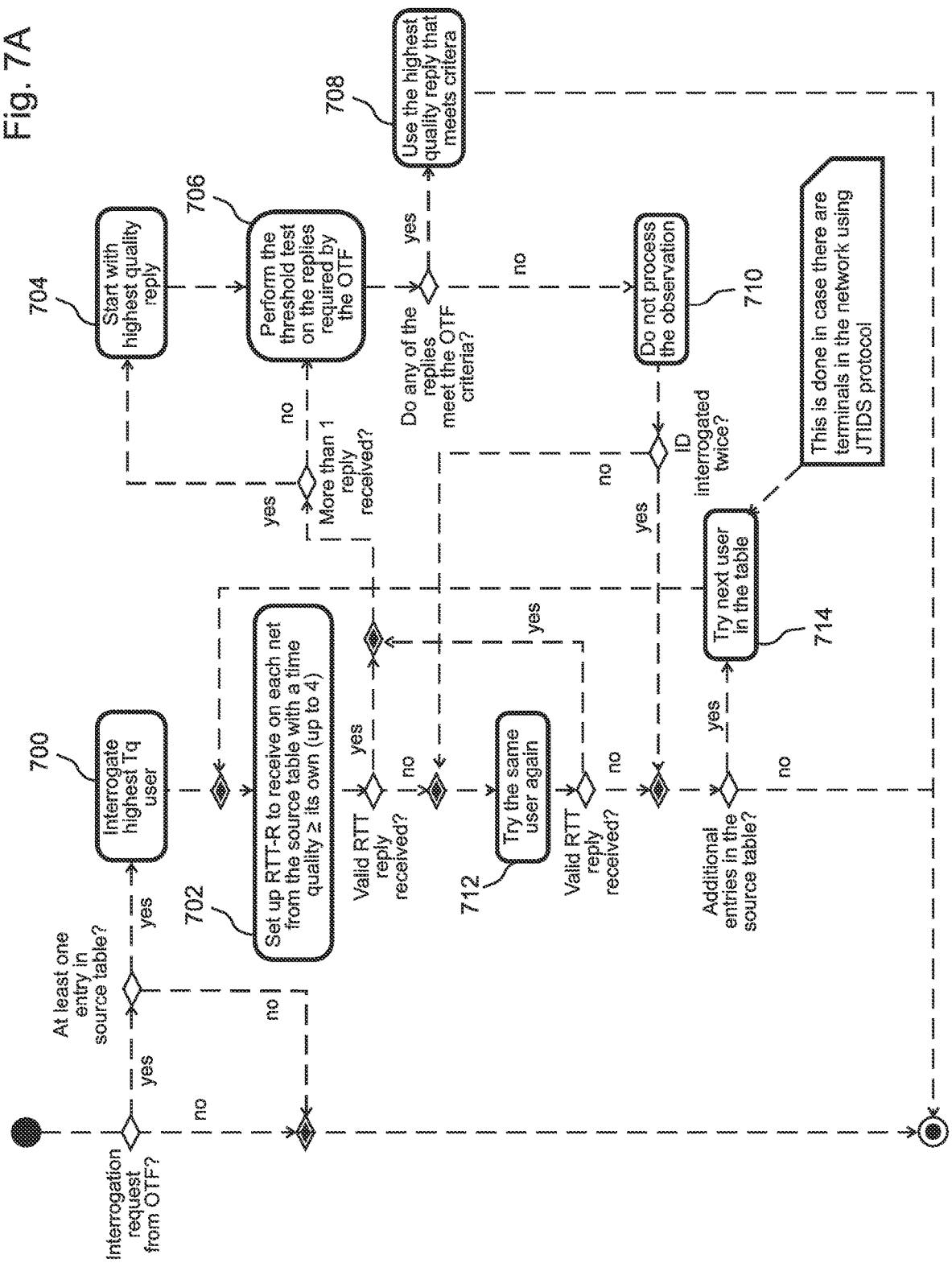

MULTINETTING TIME SYNCHRONIZATION

FIELD

The following disclosure relates to maintaining and improving timing synchronization among nodes in a network and, more particularly, to maintaining and improving the timing synchronization of a network node that is able to receive data concurrently on a plurality of subnets of the network.

BACKGROUND

Many networks, including many wireless networks, rely on precise timing for maximum communication efficiency and bandwidth. For example, information is exchanged by many networks over a plurality of "subnets" during carefully regulated "timeslots." If access to a network time reference is not readily available to all nodes at all times, it becomes necessary for each of the nodes to maintain its own internal time base. It can then be crucial for each node to maintain its time synchronization by periodically exchanging synchronization messages with the network time reference.

However, when a large number of nodes request synchronization at the same time, and only one, or only a few, network time reference nodes are able to respond, each node can be required to transmit multiple requests before achieving synchronization, which can place a significant burden on the network, and can degrade the synchronization of the nodes.

What is needed, therefore, is an apparatus and method of successfully and efficiently synchronizing internal time bases of nodes in a network with a network time reference (NTR), while minimizing the number of synchronization messages that must be exchanged, even when the NTR is unable to respond to all of the synchronization messages that it receives.

SUMMARY

The present disclosure is an apparatus and method of successfully and efficiently synchronizing internal time bases of nodes in a network with a network time reference (NTR), while minimizing the number of synchronization messages that must be exchanged, even when the NTR is unable to respond to all of the synchronization messages that it receives A first general aspect of the present disclosure is an apparatus that includes a first node comprising a controller, a transmitter, a plurality of receivers, and an internal time base. The controller is configured to estimate a time quality of the first node, said time quality being a number indicating a degree of correspondence of the internal time base with an external reference time base. The controller is further configured to maintain a source table containing identities and time qualities of a plurality of source table nodes with which the first node is able to communicate via a network.

During a requesting time period, the controller is configured to:

A) assign to the transmitter a subnet of the network, said subnet of the network being associated with a highest time quality of the time qualities of the source table nodes, said highest time quality being higher than the time quality of the first node;

B) assign to a first receiver of the plurality of receivers the subnet of the network that was assigned to the transmitter;

C) assign to each of at least one additional receiver of the plurality of receivers a subnet of the network that is associated with a time quality of the source table nodes that is lower than the highest time quality of the time qualities of the source table nodes, but higher than the time quality of the first node;

D) cause the transmitter to transmit a synchronization request; and

E) if one or more responses to the synchronization request are received from a corresponding one or more responding nodes by at least one of the plurality of receivers, improve the time quality of the first node according to the response received from the responding node having a highest time quality of the responding nodes.

A second general aspect of the present disclosure is non-transitory computer readable media comprising instructions which, when executed, cause a controller of a first node to estimate a time quality of the first node, said time quality being a number indicating a degree of correspondence of the internal time base with an external reference time base, maintain a source table containing identities and time qualities of a plurality of source table nodes with which the first node is able to directly communicate via a network, and during a requesting time period:

A) assign to the transmitter a subnet of the network, said subnet of the network being associated with a highest time quality of the time qualities of the source table nodes, said highest time quality being higher than the time quality of the first node;

B) assign to a first receiver of the plurality of receivers the subnet of the network that was assigned to the transmitter;

C) assign to each of at least one additional receiver of the plurality of receivers a subnet of the network that is associated with a time quality of the source table nodes that is lower than the highest time quality of the time qualities of the source table nodes, but higher than the time quality of the first node;

D) cause the transmitter to transmit a synchronization request; and

E) if one or more responses to the synchronization request are received from a corresponding one or more responding nodes by at least one of the plurality of receivers, improve the time quality of the first node according to the response received from the responding node having a highest time quality of the responding nodes.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 7A is a logical flow diagram that illustrates implementation of the present disclosure by a requesting node in an embodiment that is applied to a Link 16 network.

DETAILED DESCRIPTION

Disclosed herein is an apparatus and method of successfully and efficiently improving the synchronization of an internal time base of a multi-netting network node with an external time reference.

Figure 1:
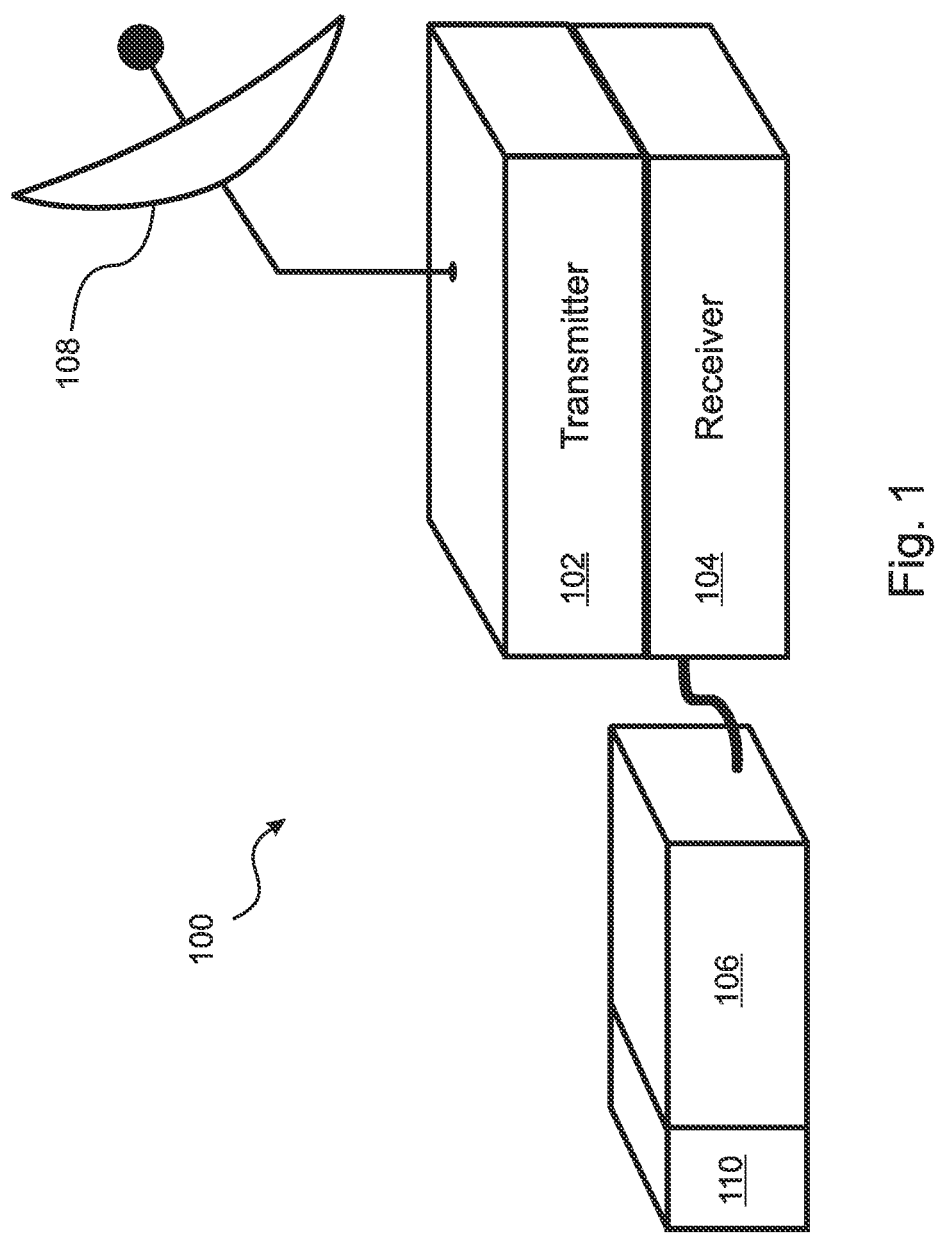
FIG. 1 is a block diagram that illustrates the structure of a single-netting node of a wireless network.

With reference to FIG. 1, a node 100 in a network functionally includes a transmitter 102 and a receiver 104, both of which are controlled by a controller 106. If the node 100 is a wireless node, such as a software-defined radio, then it also includes an antenna 108. Networks sometimes comprise a plurality of "subnets" over which data can be transmitted and received in parallel. In such cases, it is necessary at any given time for the controller 106 to assign the transmitter 102 and/or receiver 104 to specific subnets for transmitting and receiving data. Typically, integer "subnet numbers" are assigned to the subnets. A Link 16 network is an example of this approach.

For some networks, each of the nodes further includes an internal time base 110 that is used to set the timing of transmission bursts, switching between subnets, and other time-critical network tasks. It can be highly important in some of these networks to maintain a high degree of synchronization between the internal time bases 110 of the nodes, so that they agree with each other as closely as possible. One approach is to establish an external time reference, such as a GPS signal or other external signal, with which all of the time bases can be periodically synchronized. The external time reference is sometimes referred to as the "network time reference" (NTR), where the term NTR can sometimes refer to a node in the network whose internal time base is defined to be the network time reference for the remainder of the nodes.

A certain degree of imprecision is inherent to any time base. Accordingly, after synchronization, an internal time base will drift out of perfect alignment with the NTR, resulting in a time "uncertainty" that will increase until its next synchronization with the NTR. This time "uncertainty" can be expressed as a time "quality," which can be estimated by the node controller 106, for example based upon the known precision of the time base and on the amount of time that has elapsed since the most recent synchronization with the NTR. Different time quality numbering systems can apply, such as an estimated percentage of correspondence, where 100% is absolute synchronization and 0% is no synchronization. In other networks the time qualities are integers. For example, in a Link 16 network the time qualities range from 15 down to 1, with 15 being exact timing correspondence with the NTR, and 1 being very low correspondence (i.e. high timing uncertainty, low time quality).

As the time quality of a node degrades, it becomes increasingly important for the node to resynchronize its internal time base with the NTR. However, it is not always possible for each node in a network to communicate directly with the NTR at all times. One approach, when the NTR is not available, is for a node to broadcast a synchronization request on a designated subnet to other nodes on the network that have more recently synchronized their internal time bases, and therefore have higher time qualities. If a response is received from a node having a higher time quality than the requesting node, even if it is not a response with perfect time quality, the requesting node can at least improve its time quality to be equal to the time quality of the received response.

However, it would be inefficient for each synchronization request to be received by all of the nodes in the network, in that only nodes having a higher time quality can provide a useful response. Instead, some networks associate certain subnets with specific time qualities or ranges of time quality. For example, subnet 1 can be associated with time qualities between 90% and 100%, subnet 2 can be associated with time qualities between 80% and 90%, and so forth. Or, if the time qualities are integer time qualities, then, for example, subnet 1 can be associated with time quality 1, subnet 2 with time quality 2, and so forth. Synchronization requests can then be transmitted only on those subnets that are associated with time qualities that are higher than the time quality of the requesting node, and nodes that are available to respond to a synchronization request need only monitor subnets that are associated with their time qualities.

However, time and network traffic will be wasted if synchronization requests are transmitted on subnets that are not being monitored for such requests, as will be the case if none of the nodes that are reachable by the requesting node has a time quality that is associated with the subnet on which the request is transmitted. One approach is for each of the nodes to maintain a "source table" containing the identities and time qualities of other nodes that are reachable on the network. Synchronization requests can then be transmitted only on subnets that are associated with time qualities of nodes included in the source table.

Figure 2:
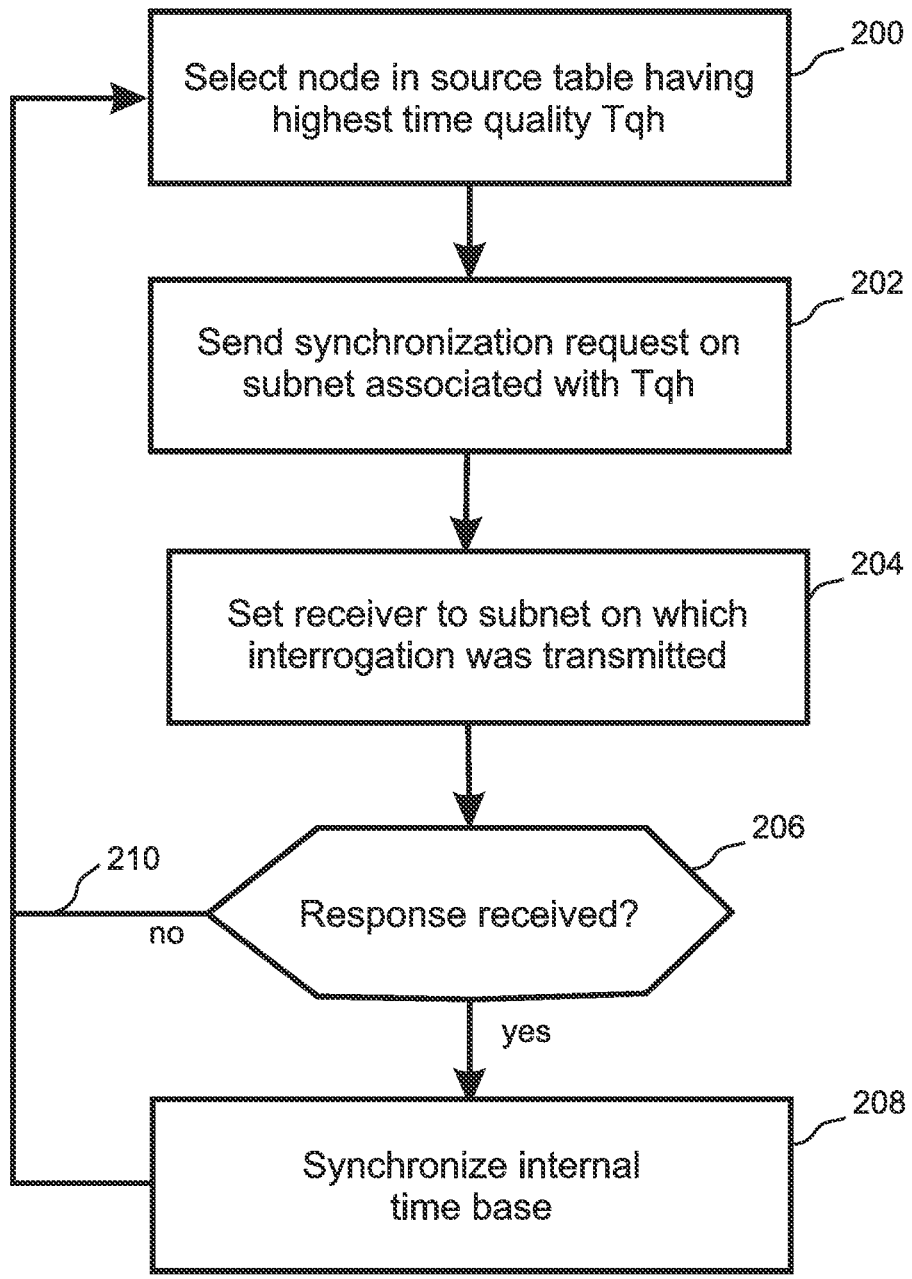
FIG. 2 is a simplified flow diagram that illustrates a method of synchronization implemented by single-netting nodes.

FIG. 2 summarizes this approach to time synchronization. When it becomes necessary to improve the time quality of a node, and the NTR is not accessible, the node that is seeking to improve its time quality, referred to as the "requesting" node, selects 200 the node in its source table ("source table node") that has the highest time quality Tqh from among the source table nodes, and transmits a synchronization request 202 on the subnet that is associated with Tqh. The requesting node then causes its receiver to monitor 204 the subnet on which the synchronization request was transmitted. If a response is received 206 from a "responding" node, then it is used to improve 208 the node's time quality. If no response is received 210, then the process is repeated, either on the same subnet or on a subnet that is associated with a lower time quality, typically with the next highest time quality Tqnh in the source table.

It will be noted that the terms "requesting" node and "responding" node refer herein only to the role that each node plays during a given synchronization request and response. In various embodiments, nodes of the network can function as requesting nodes during some time periods and as responding nodes during other time periods. When referring to a specific node, these time periods are sometimes referred to herein respectively as "requesting" time periods and "responding" time periods of the node.

It will also be noted that the term "equals" as it applies to subnet numbers and time qualities does not necessarily represent a mathematical relationship. Instead, the term refers to an association between the subnet and the time quality. Thus for example, when the highest time quality of a node is represented by the numeral 15, an associated subnet can also be represented with the numeral 15, the word "highest", letters, or any other identifier/word/phrase that directly or indirectly maps a node to its time quality. Further, time quality itself does not necessarily need to be described in numerical terms. Any phrases, terms, or other identifiers that maintain a hierarchal relationship would suffice to define time quality.

Link 16 is an important network standard that implements these approaches to time base synchronization. Accordingly, Link 16 is used herein as an exemplary embodiment to elucidate features of the present disclosure. However, it will be understood that the present disclosure is not limited to Link 16 networks In the specific case of Link 16, the time qualities are assigned as integers, with the highest possible time quality being 15. Integer subnet numbers are assigned to the subnets, and subnets 1-15 are associated, respectively, with time qualities 1-15. Each node in a Link 16 network maintains a source table that includes four other reachable nodes. The internal time base of a node in a Link 16 network is referred to as an "oscillator tracking filter" (OTF). Synchronization requests in a Link 16 network are referred to as "round trip timing" or "RTT" interrogations.

Nodes of a Link 16 network can have various configurations. For example, the block diagram of FIG. 2 is applicable to a "Joint Tactical Information Distribution System (JTIDS) 200, each of which includes a transmitter 202 a receiver 204, a controller 206, and at least one antenna 208. For the purposes of the present disclosure, JTIDS and Multifunctional Information Distribution System Low Volume Terminals (MIDS-LVT) are considered to be functionally equivalent, and the term JTIDS is used generically to refer to both standards and to both terminal types.

Figure 3:
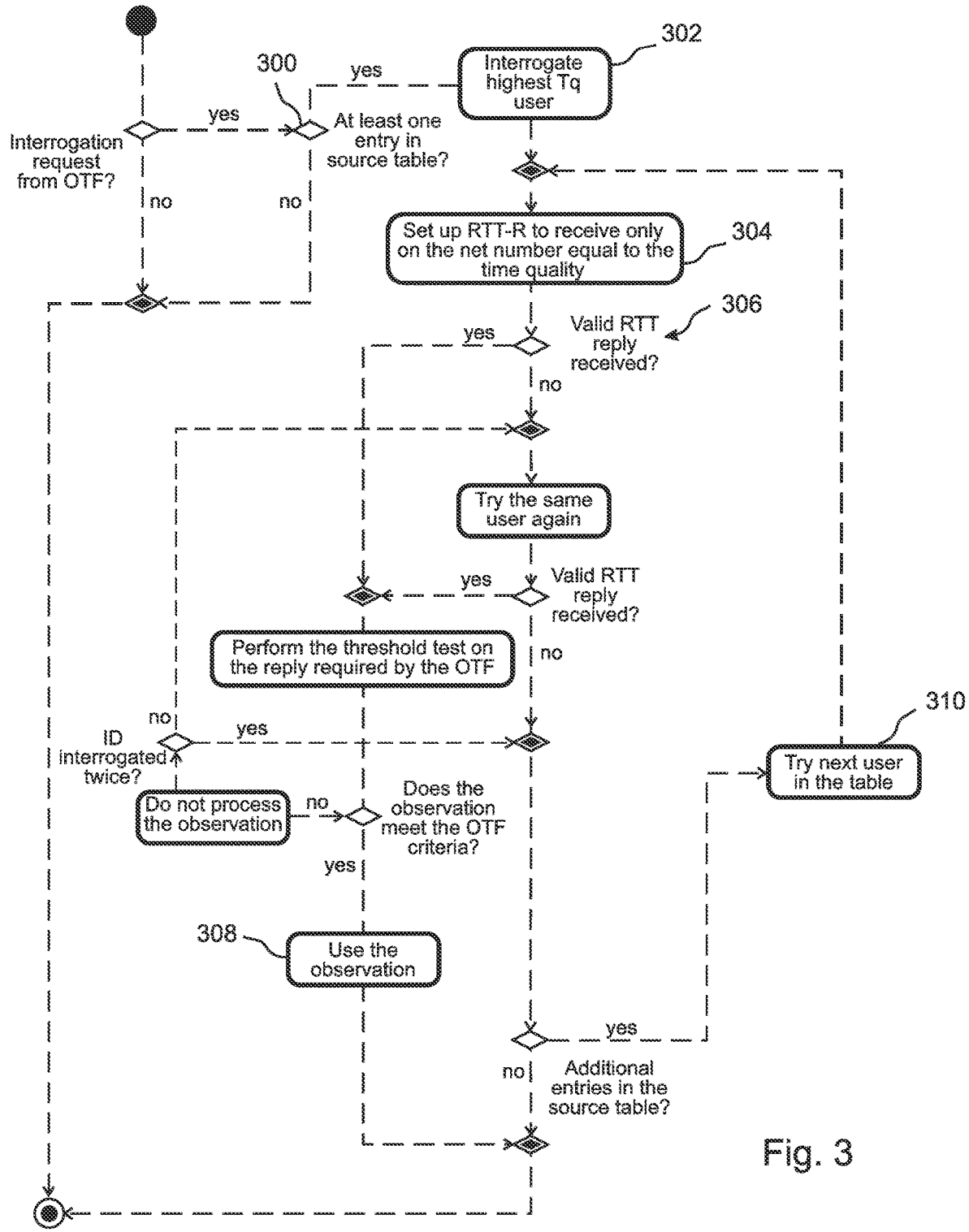
FIG. 3 is a logical flow diagram that illustrates the method of FIG. 2 for an example that is implemented in a Link 16 network

With reference to FIG. 3, a JTIDS Link 16 node that requires an update to the synchronization of its OTF will review its source table to determine 300 which of the nodes in the source table has the highest time quality Tqh, and will transmit 302 an RTT synchronization request (interrogation) during the first half of an RTT timeslot on the subnet having a subnet number equal to Tqh. It will then monitor 304 the same subnet for a response during the second half of the RTT timeslot, and if a response is received 306 it will use the response to synchronize 308 its OTF. If no response is received 310, possibly after several attempts, it will repeat the procedure by transmitting a synchronization request on the subnet having a subnet number equal to the second highest time quality of the nodes in its source table. This process will continue until a response is received, or all of the entries in the source table have been exhausted.

If a series of one or more RTT exchanges are successful and the OTF of a JTIDS node is able to converge on the frequency of the NTR, it will declare fine synchronization and continue to refine its time quality until it reaches a Tq value that is one lower than the Link 16 node it is interrogating. This approach allows a Link 16 network to have a common time base so long as at least one of the nodes in the network is able to directly communicate with the NTR.

According to the approach of FIGS. 2 and 3, if, most of the time, the NTR or a node that is fully synchronized with the NTR is able to respond to all of the synchronization requests, then it will not be necessary to repeat any of the synchronization requests, and the synchronization process will proceed efficiently. However, if the NTR and the nodes that are fully synchronized with the NTR become overloaded and are unable to respond to all of the synchronization requests, then it will be necessary to repeat many of the requests, and the number of synchronization requests that are transmitted on the network may increase dramatically.

For example, if the synchronization requests can only be transmitted during certain specified synchronization timeslots, and if the NTR is the only reachable node with the "highest" time quality, then each of the nodes that is generating synchronization requests will transmit multiple requests to the NTR, and will then fall back on another user node that has a lower time quality. However, since the NTR node is reachable, and thus included in the source tables of the other nodes, each of the nodes will continue to attempt to improve their time quality by interrogating the NTR first, thereby using more synchronization timeslots and reducing the overall time quality of the entire network.

As the time between successful synchronizations increases, the covariance between the internal time bases will grow, reducing the time qualities of the nodes. Accordingly, in networks where only one, or only a few, nodes of highest time quality are reachable by a large number of other nodes, and are therefore only able to respond to a small fraction of the synchronization requests that it/they receive, the time qualities of the nodes will be erratic.

Figure 4:
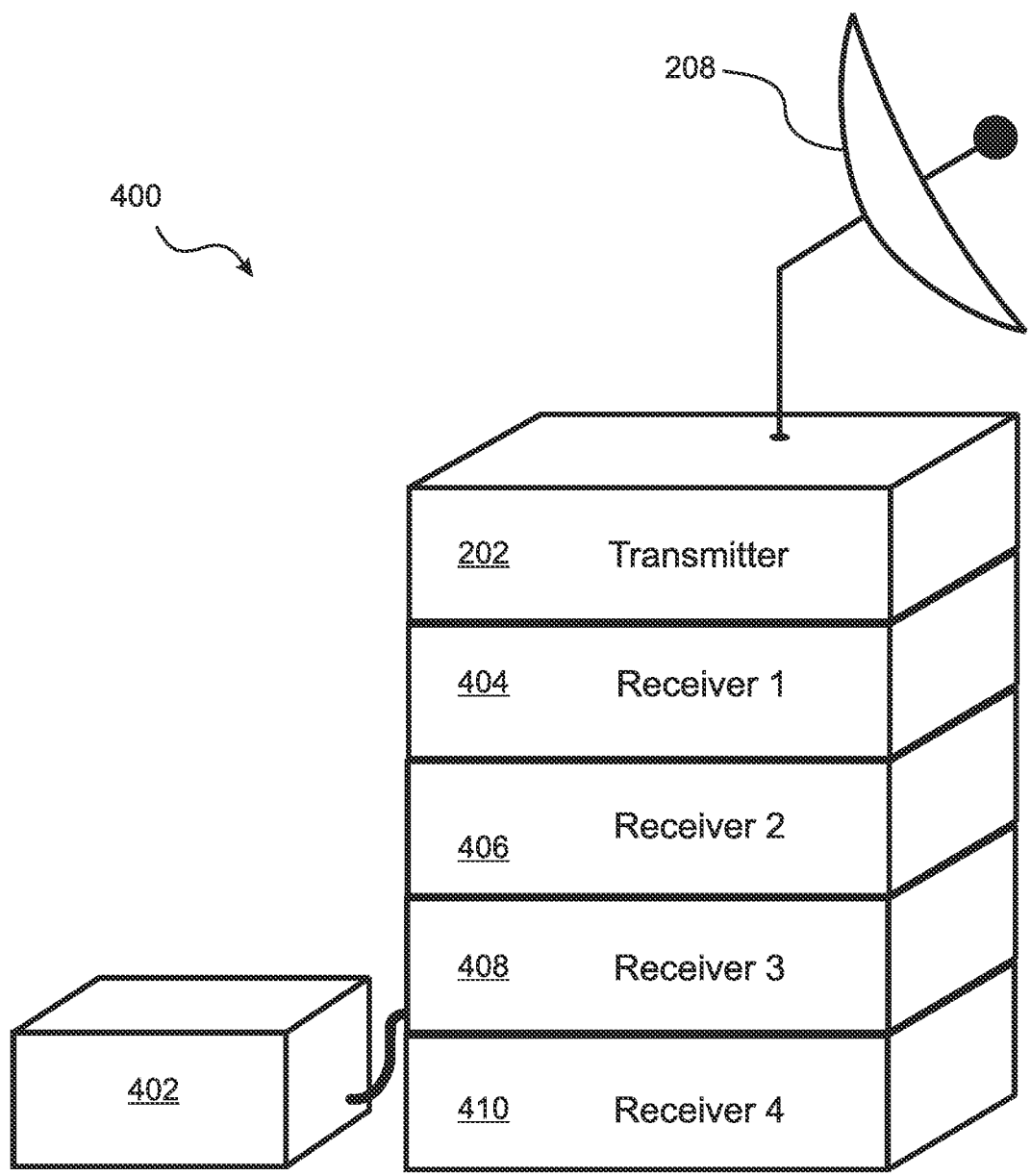
FIG. 4 is a block diagram that illustrates the structure of a multi-netting terminal configured to implement an embodiment of the present disclosure.

Nodes such as the JTIDS (FIG. 1) are considered single-netting nodes, in that they each have only one receiver 104. With reference to FIG. 4, some networks include "multi-netting" nodes, each having a plurality of receivers 404, 406, 408, 410, all of which are controlled by the controller 402. The present disclosure takes advantage of these additional receivers 406, 408, 410 to enhance the efficiency of network synchronization requests, as compared to the methods illustrated in FIGS. 2 and 3.

Figure 5A:
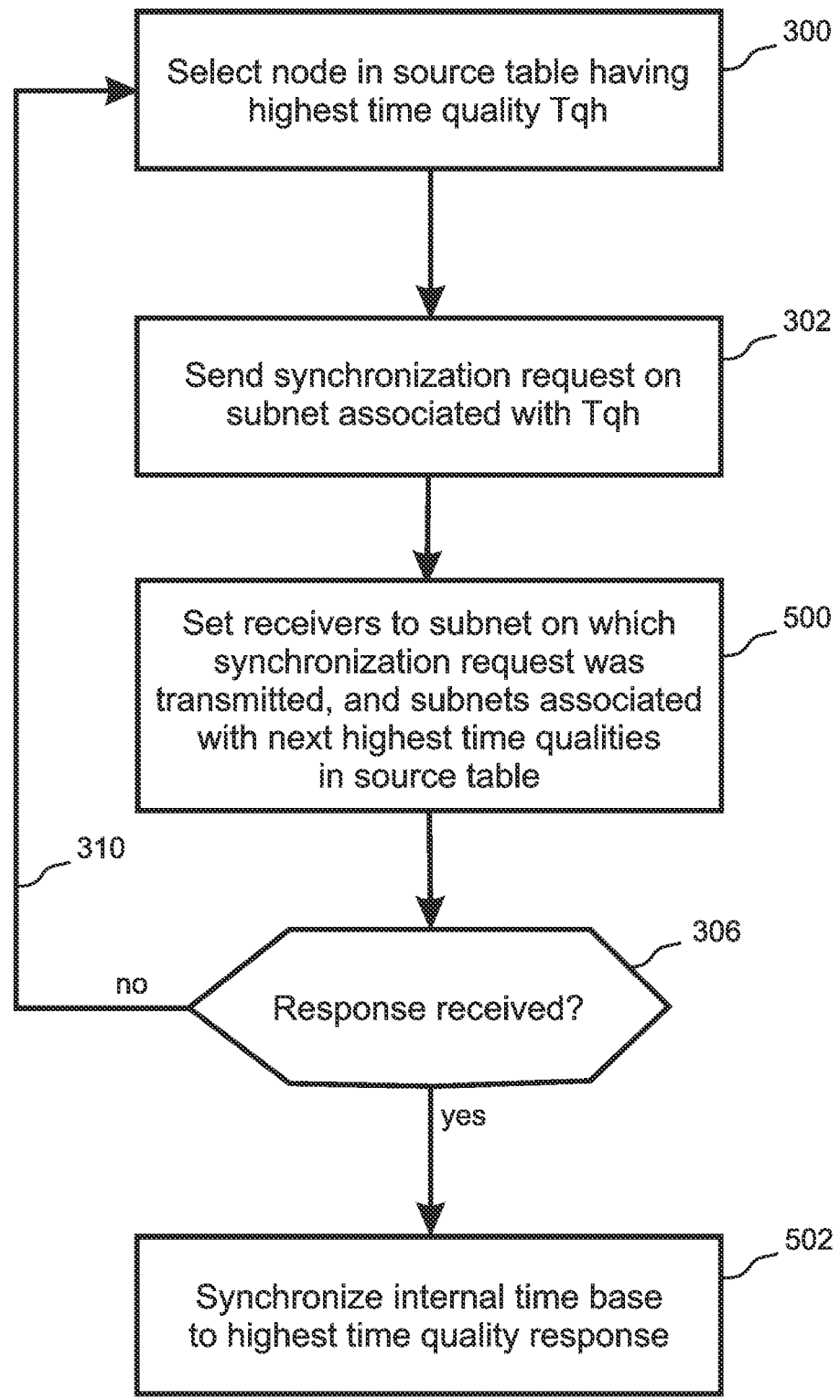
FIG. 5A is a simplified flow diagram that illustrates transmission of a synchronization request and receiving a response according to an embodiment of the present disclosure.

With reference to FIG. 5A, according to the present disclosure, the requesting node reviews the nodes in its source table to determine 300 which of them has the highest time quality Tqh, and then transmits 302 a synchronization request on the subnet that is associated with time quality Tqh. These steps are comparable to the first two steps 300, 302 of the single-netting method of FIG. 2. However, instead of monitoring for a response only on the subnet on which the synchronization request was transmitted, the requesting node utilizes its additional receivers 406, 408, 410 to monitor additional subnets 500 having the next-lower time qualities of the nodes in its source table, to the extent that these time qualities are higher than its own. The requesting terminal thereby receives up to four replies from four different responding nodes. If at least one response is received 306, then the requesting node uses the highest time quality response to improve the synchronization 502 of its internal time base. If no response is received 310, then the synchronization request is repeated on the subnet that is associate with the next highest time quality Tqnh of the nodes in the source table.

As noted above, the terms "requesting" node and "responding" node refer herein only to the role that each node plays during a given synchronization request and response. In various embodiments, nodes of the network can function as requesting nodes during some time periods and as responding nodes during other time periods. When referring to a specific node, these time periods are sometimes referred to herein respectively as "requesting" time periods and "responding" time periods of the node.

Figure 5B:
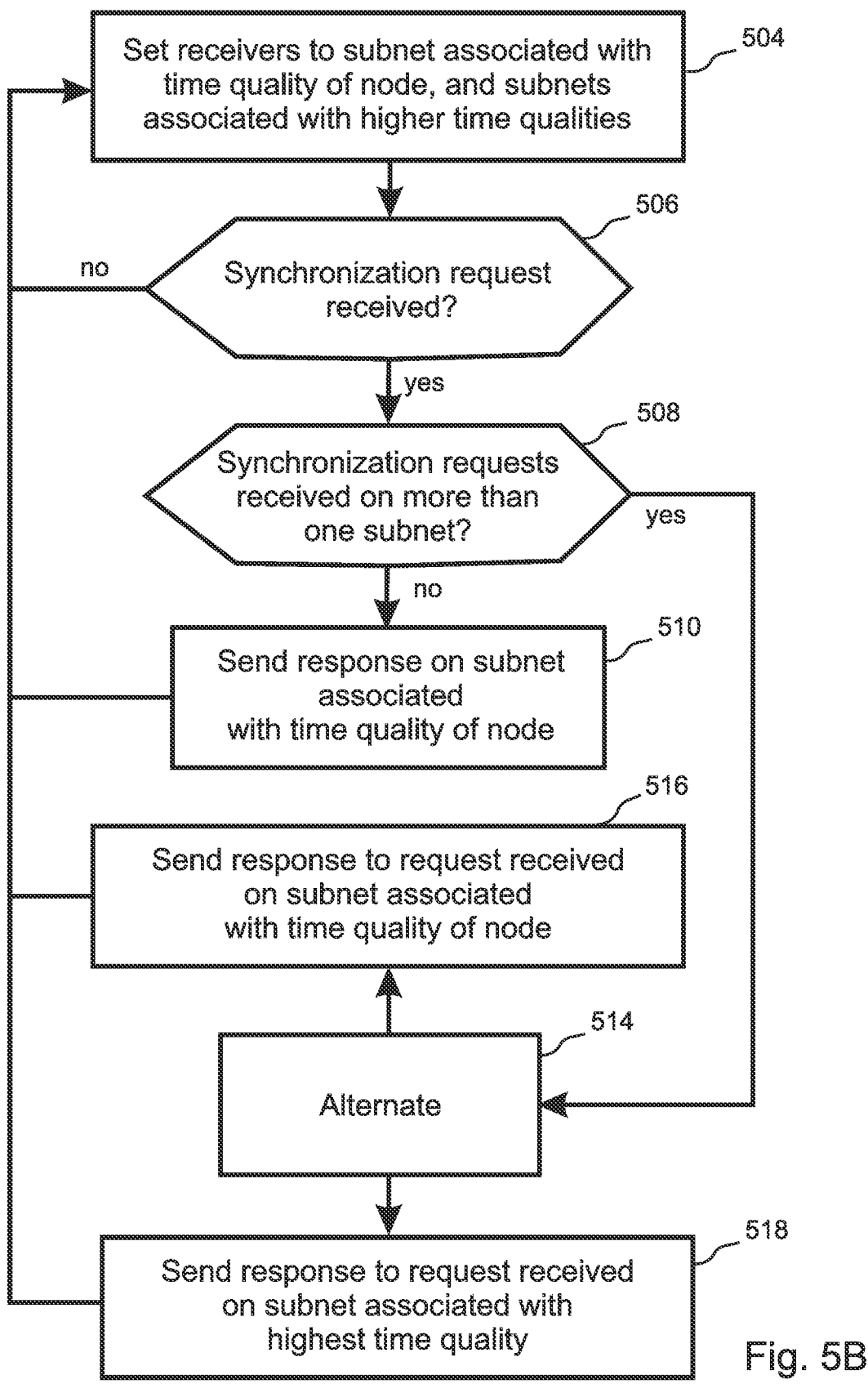
FIG. 5B is a simplified flow diagram that illustrates receiving of a synchronization request and transmitting of a response according to an embodiment of the present disclosure.

FIG. 5B illustrates implementation of an embodiment of the present disclosure by a "responding" node, where the term "responding node" refers to a node having a time quality that does not currently require improvement, and that is monitoring the network in preparation for responding to synchronization requests transmitted by requesting nodes. According to the disclosed embodiment, the responding node simultaneously monitors 504 the subnet that is associated with its time quality, and up to three additional subnets associated with consecutively next higher time qualities. If a single synchronization request is received 506 on any one of the monitored subnets, the responding node will transmit a response on the subnet that is associated with its time quality 510.

An example of a node having a plurality of receivers, as illustrated in FIG. 4, is the Link 16 "Joint Tactical radio System" (JTRS) terminal. In addition to a controller 402, transmitter 202, antenna 208 and first receiver 404, each JTRS terminal 400 includes three additional Link 16 logical receivers 406, 408, 410 that can operate simultaneously, thereby receiving data on up to four subnets at the same time. The disclosed method, in embodiments that are applied to JTRS terminals in Link 16 networks, provides enhanced RTT synchronization by utilizing all four receivers 404, 406, 408, 410 of the JTRS terminal 400, both when transmitting and receiving synchronization requests, and when transmitting and receiving synchronization replies, while remaining compatible with the single-netting protocols described above with reference to FIGS. 3A and 3B, implemented for example by JTIDS terminals in the same network.

With reference again to FIG. 5A, in embodiments where the present disclosure is applied to JTRS Link 16 terminals, the requesting node reviews its source table to determine 300 which of them has the highest time quality Tqh, and then transmits 302 a synchronization request during the first half of an RTT timeslot on the subnet having a subnet number equal to Tqh. Instead of monitoring for a response only on the subnet on which the synchronization request was transmitted, the JTRS terminal utilizes its additional receivers 406, 408, 410 to monitor up to three additional subnets 500 having subnet numbers equal to the three next-lower time quality values of the nodes in its source table, to the extent that these time qualities are higher than its own. The JTRS terminal thereby receives up to four replies from four different nodes, which are referred to herein in aggregate as the "observation" that results from the synchronization request. If at least one response is received 306, then the highest time quality response is used to improve the synchronization of the internal time base. If no response is received 310, possibly after several attempts, then a synchronization request is transmitted on the subnet having a subnet number equal to the next highest time quality Tqnh of the nodes in the source table.

For example, if the requesting node has a time quality of 10, and if its source table includes four nodes having, respectively, time qualities of 15, 14, 13, and 12, then the requesting node will transmit its synchronization request on subnet 15, and will simultaneously monitor subnets 15, 14, 13, and 12 for a response. If the source table includes only two nodes having time quality 14, one node having time quality 12, and one node having time quality 11, then the requesting node will transmit its synchronization request on subnet 14, and will simultaneously monitor subnets 14, 12, and 11 for a response.

With reference again to FIG. 5B, in embodiments that are implemented on JTRS nodes in a Link 16 network, JTRS responding nodes that are monitoring the network for synchronization requests during the first half of an RTT timeslot simultaneously monitor 504 the subnet having a subnet number equal to the time quality of the responding node, and up to three additional subnets having consecutively next higher subnet numbers. If a single synchronization request is received 506 on any one of the monitored subnets, the responding node will transmit a response to that request on the subnet having a net-number equal to its time quality 510. For example, if a responding node has a time quality of 11, it will monitor subnets 11, 12, 13, and 14. If it receives a single synchronization request on any one of those four subnets, it will transmit a response to that synchronization request on subnet 11. Similarly, a responding node having time quality 13 will monitor subnets 13, 14, and 15, and will transmit its response on subnet 13.

In embodiments, if more than one synchronization request is received by a responding node on the same subnet, and therefore by the same receiver, within the same timeslot, the responding node will transmit a response to the request that originated from the first of the synchronization requests that is received, which will typically be the closest requesting node.

In various embodiments, if synchronization requests are repeatedly received by a responding node on more than one subnet 508 during the same timeslot, the responding node will alternate 514 between transmitting a response to a synchronization request received on the subnet associated with the responding node's time quality 516, and transmitting a response to the synchronization request that was received on the subnet associated with the highest time quality 518 of the subnets on which the synchronization requests were received. In all cases, the response will be transmitted on the subnet that is associated with the time quality of the responding node.

For example, if a responding node in a Link 16 network has a time quality of 13, and if it simultaneously and repeatedly receives synchronization requests on subnets 13 and 15, it will alternate between responding to the synchronization request received on subnet 13 and the synchronization request received on subnet 15, according to a specified rate of alternation. In all cases, the response will be transmitted on subnet 13.

Figure 6A:
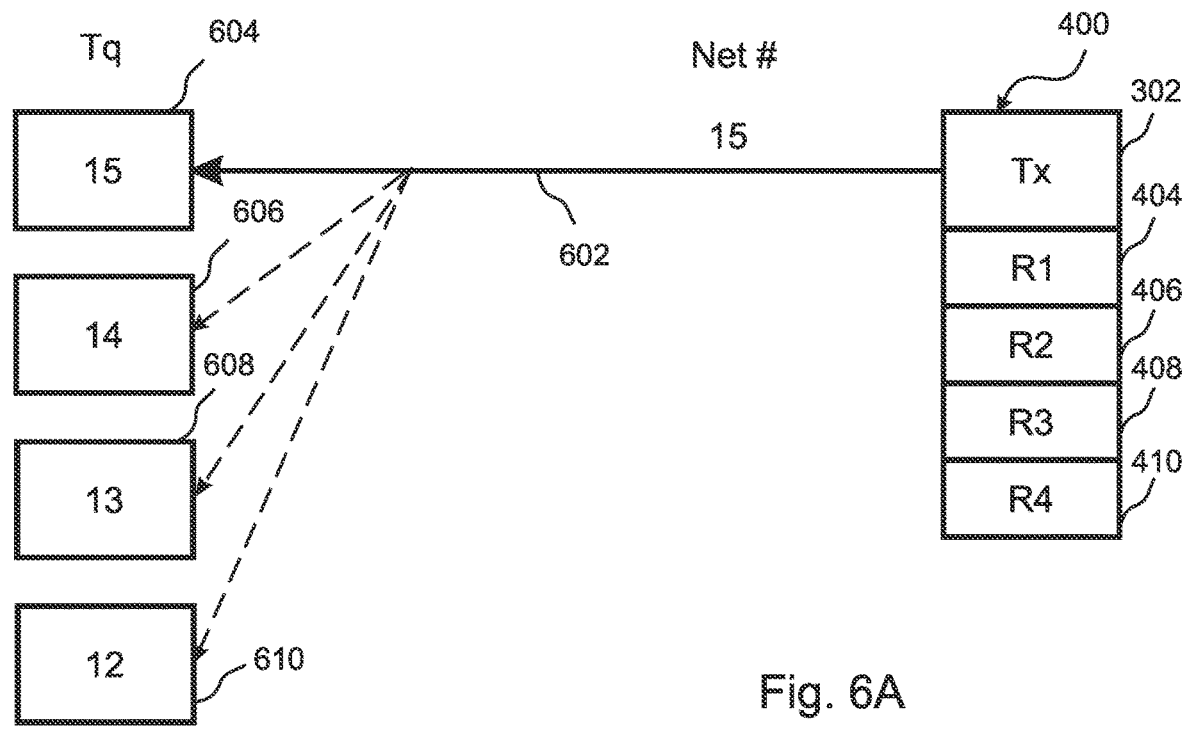
FIG. 6A is a block diagram that illustrates transmitting of an synchronization request during the first half of an RTT timeslot, according to an embodiment of the present disclosure that is applied to a Link 16 network.
Figure 6B:
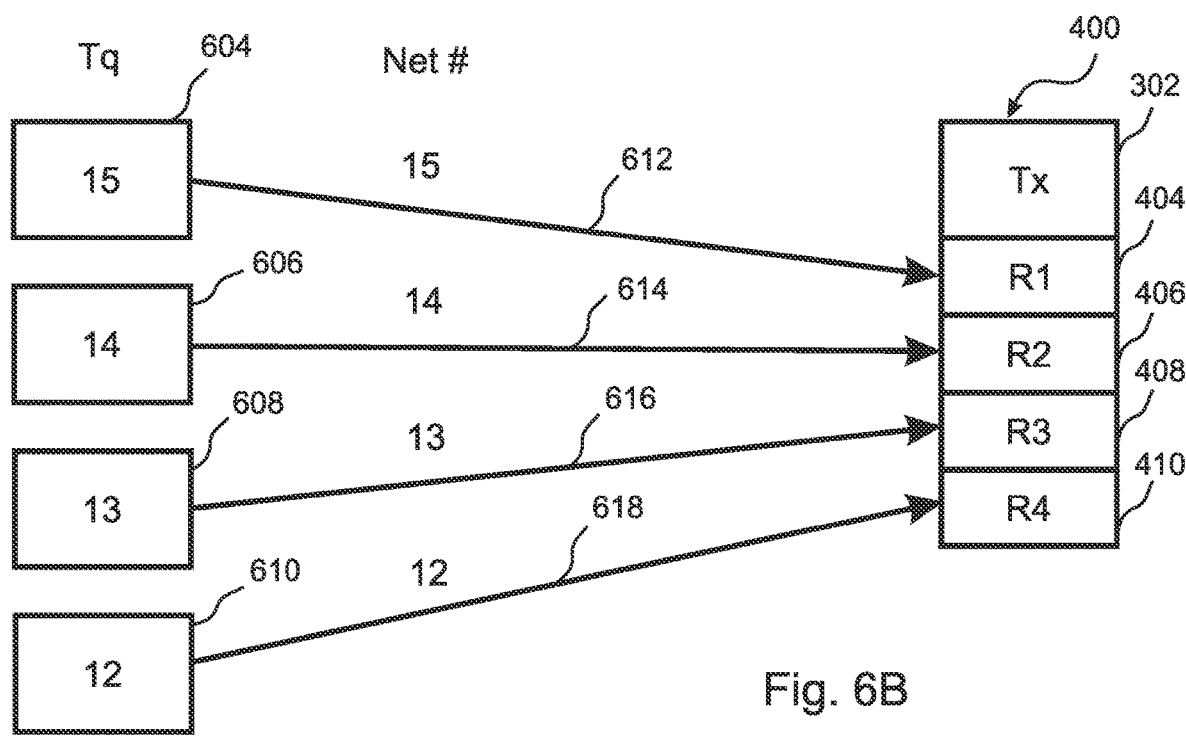
FIG. 6B is a block diagram that illustrates responding to the synchronization request of FIG. 6A during the second half of the RTT timeslot, according to an embodiment of the present disclosure.

A simple example of the present disclosure in an embodiment that is applied to a JTRS terminal in a Link 16 network is presented in FIGS. 6A and 6B. In the illustrated example, the network includes only five JTRS nodes, which are the requesting node 400 and four responding nodes 604, 606, 608, 610, all of which are in the source table of the requesting node 400. The requesting node 400 has time quality 10, while the four responding nodes 604, 606, 608, 610 have time qualities 15, 14, 13, and 12, respectively.

According to the present disclosure, with reference to FIG. 6A, the requesting node 400 transmits a synchronization request 602 during the first half of an RTT timeslot using the subnet number of the Link 16 node 604 having the highest time quality in its source table, which in the illustrated example is a time quality Tqh=15.

JTRS responding nodes that are monitoring the network for synchronization requests during the first half of the RTT timeslot simultaneously monitor the subnet having a subnet number equal to their time quality, and up to three additional subnets having the next sequentially higher subnet numbers. Therefore, in the illustrated example, all four of the responding nodes 604, 606, 608, 610 receive the synchronization request 602 that was transmitted on subnet 15 during the first half of the RTT timeslot.

With reference to FIG. 6B, according to the disclosed embodiment, if a synchronization request was received by a responding node on any of its monitored subnets during the first half of a RTT timeslot, the responding node will transmit a response during the second half of the RTT timeslot on the subnet having a net-number equal to its time quality. Accordingly, in the illustrated example, the four responding nodes 604, 606, 608, 610 transmit responses 612, 614, 616, 618 during the second half of the RTT timeslot on subnets 15, 14, 13, and 12, respectively.

Meanwhile, during the second half of the RTT timeslot, instead of monitoring for a response only on the subnet on which the synchronization request was transmitted, as would be the case for a single-netting terminal (FIG. 1), the requesting JTRS terminal 400, according to the disclosed embodiment, utilizes all four of its Link 16 receivers 404, 406, 408, 410 to monitor for a response on the subnet on which the synchronization request was transmitted, and also on up to three additional subnets having subnet numbers equal to up to three lower time qualities of nodes in its source table, to the extent that these time qualities are higher than its own time quality. In the illustrated example, because the requesting node 400 uses its receivers 404, 406, 408, 410 to monitor subnets 15, 14, 13, and 12 respectively, all of the replies are received. In this example, the response from the responding node 604 has the highest time quality of 15, and is used by the requesting node 400 to improve its time synchronization.

If for some reason the node with the highest time quality 604 is unable to respond, then the requesting node 400 will be able to improve its synchronization based on a response received from the responding node 606 having the next-highest time quality, and so on. It will only be necessary for the requesting node 400 to transmit a second synchronization request if no response is received by any of its receivers 404, 406, 408, 410.

A logical flowchart that illustrates in more detail the steps implemented by a requesting node an embodiment that is applied to a JTRS terminal in a Link 16 network is presented in FIG. 7A. According to the illustrated embodiment, the requesting node 400 begins by transmitting 700 a synchronization request on the subnet number that is equal to the time quality Tqh of the node in its source table having the highest time quality, and then configures its four receivers 404, 406, 408, 410 to receive 702 on the subnet that was used for the transmission, and on up to three additional subnets having lower subnet numbers equal to the next lowest time qualities of the nodes in its source table, so long as all of the monitored subnet numbers are higher than the time quality of the requesting node. The one or more replies that are received are referred to herein, in aggregate, as the "observation" that is received in response to the synchronization request.

If the observation includes more than one response to the synchronization request 704, then the response that is received on the highest subnet number is considered first to determine if it meets the "OTF criteria," i.e. if its time quality is indeed higher than the time quality of the oscillator tracking filter (OTF, i.e. internal time base) of the requesting node 706. This is not guaranteed, because time qualities are not static, and the information in the requesting node's source table may not always be accurate. The received replies of the observation are considered in order of their time quality, and if a response included in the observation is found to meet the OTF criteria, then it is used 708 to improve the time synchronization of the requesting node 400.

If no replies are received, or if none of the replies is found to meet the "OTF criteria," the observation is not used 710. In the illustrated embodiment, the synchronization request is present on the subnet whose subnet number equals the highest time quality Tqh in the source table 712, but if no acceptable response is included in the repeated observation, then a synchronization request is transmitted on the subnet whose subnet number is equal to the next highest time quality Tqnh in the source table 714. As noted above, this step is included even if the first observation did not include a response on the subnet having subnet number equal to Tqnh, in case any nodes in the network with time quality Tqnh are operating as single-netting nodes (FIG. 1), and would not have received the first synchronization request.

It is notable that the synchronization performance of the present disclosure will never be worse than the single-netting protocol of FIGS. 3A and 3B, because in their first attempt at synchronization, both protocols transmit a synchronization request 302, 700 and listen for a response 304, 702 on the subnet that is associated with the highest time quality in the source table Tqh. Therefore, if a node having time quality Tqh is able to respond to the synchronization request, the performance of the two protocols will be the same. However, if none of the nodes having time quality Tqh is able to respond, according to the present disclosure the requesting user will usually receive at least one response from a node having a time quality lower than Tqh, but higher than the requesting node.

Figure 7B:
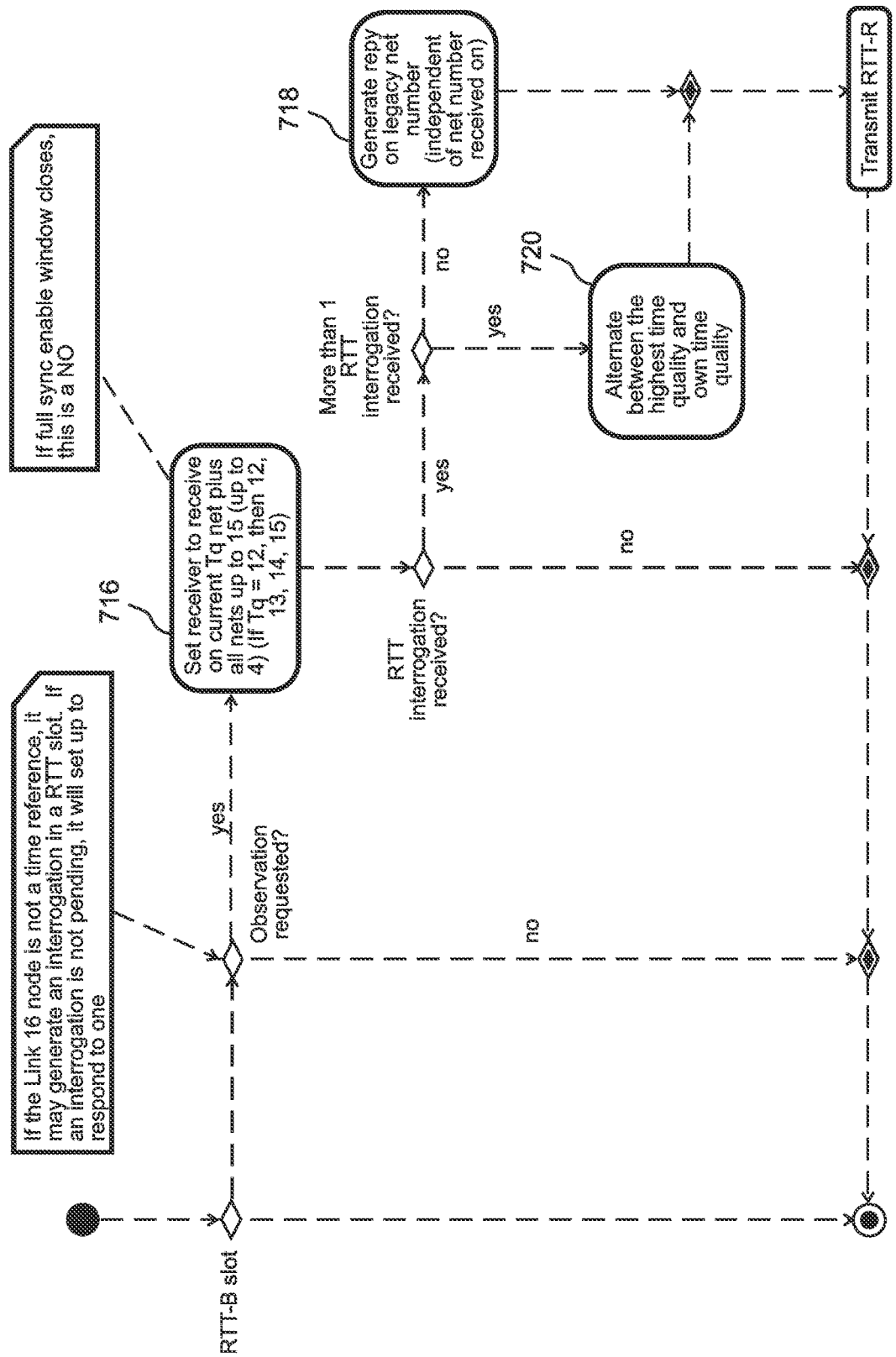
FIG. 7B is a logical flow diagram that illustrates implementation of the present disclosure by a responding node in an embodiment that is applied to a Link 16 network.

In reference to FIG. 7B, in embodiments implemented on JTRS nodes of a Link 16 network, "responding" nodes, i.e. nodes that are not initiating synchronization requests during a given RTT timeslot, will configure their four receivers 404, 406, 408, 410 to receive synchronization requests on the subnets having subnet numbers equal to their time quality, and on up to three sequentially higher subnet numbers 716. If a synchronization request is received, the node will transmit a response on the subnet having subnet number equal to its time quality 718, which is referred to in the drawing as the "legacy" subnet number because it is substantially the same step as in the "legacy" JTIDS protocol. The difference is that, according to the present disclosure, the responding node can concurrently receive synchronization requests transmitted on more than one subnet.

In embodiments, if more than one synchronization request is received by a responding node on the same subnet, and therefore on the same receiver, within the same timeslot, the responding node will transmit a response to the first of the synchronization requests that is received, which will typically be the synchronization request that originated from the closest requesting node.

In various embodiments, if synchronization requests are received by a responding node on more than one subnet during the same RTT timeslot, the responding node will alternate between transmitting a response to an RTT synchronization request received on the subnet having a subnet number equal to the responding node's time quality, and responding to an RTT synchronization request received on a subnet having a higher subnet number 720. For example, if a responding node has a time quality of 13, and if it simultaneously and repeatedly receives synchronization requests on subnets 13 and 15, it will alternate between responding to the synchronization request received on subnet 13 and the synchronization request received on subnet 15. In all cases, the response will be transmitted on subnet 13.

It will be noted that the present disclosure enables multi-netting nodes to be fully interoperable with single-netting nodes in the same network. For example, if a Link 16 network includes both JTIDS and JTRS nodes, each will be able to implement its corresponding protocol with full inter-compatibility and with optimal network performance.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications. The disclosure presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. An apparatus comprising:
   a first node comprising a controller, a transmitter, a plurality of receivers, and an internal time base;
   the controller being configured to estimate a time quality of the first node, said time quality indicating a degree of correspondence of the internal time base with an external network time reference (NTR);
   the controller being further configured to maintain a source table containing identities and time qualities of a plurality of source table nodes with which the first node is able to directly communicate via a network;
   wherein the controller is configured, during a requesting time period, to:
   A) assign to the transmitter a subnet of the network that is associated with a highest time quality (Tqh) of the time qualities of the source table nodes, wherein the Tqh is higher than the time quality of the first node;
   B) assign to a first receiver of the plurality of receivers the subnet of the network that was assigned to the transmitter;
   C) assign to a second receiver of the plurality of receivers a subnet of the network that is associated with a next highest time quality Tqnh of the source table nodes, Tqnh being lower than Tqh, but higher than the time quality of the first node;
   D) cause the transmitter to transmit a synchronization request; and
   E) when one or more responses to the synchronization request are received from a corresponding one or more responding nodes by at least one of the plurality of receivers, improve the time quality of the first node according to the response received from the responding node having a highest time quality of the responding nodes.

2. The apparatus of claim 1, wherein the controller is further configured to repeat steps D) and E) when no response to the synchronization request is received.

3. The apparatus of claim 1, wherein, when no response to the synchronization request is received, the controller is further configured to:
   assign to the transmitter the subnet of the network that is associated with time quality Tqnh; and
   repeat steps B) through E), where Tqnh is substituted in place of Tqh in step C).

4. The apparatus of claim 1, wherein the plurality of receivers comprises four receivers.

5. The apparatus of claim 1, wherein the plurality of source table nodes comprises four source table nodes.

6. The apparatus of claim 1, wherein:
   the time qualities of the first node, the source table nodes, and the responding nodes are integer time qualities;
   integer subnet numbers are assigned to the subnets of the network; and
   each of the subnets is associated with the integer time quality that is equal to its integer subnet number.

7. The apparatus of claim 1, wherein the network is a Link 16 network, and the first node comprises a Joint Tactical Radio System (JTRS) Link 16 terminal.

8. The apparatus of claim 1, wherein during a responding time period that is not the requesting time period, the controller is further configured to:
   I) assign to the transmitter and to the first receiver the subnet of the network that is associated with the time quality of the first node;
   II) assign to the second receiver a subnets that is associated with a time quality that are higher than the time quality of the first node; and
   III) transmit a response to a synchronization request that is transmitted by a second node and received by one of the plurality of receivers.

9. The apparatus of claim 8, wherein the controller is further configured, when a plurality of synchronization requests are received during the responding time period by a same one of the receivers, a first of the synchronization requests being received before a remainder of the synchronization requests, to cause the transmitter to transmit the response to the first of the synchronization requests.

10. The apparatus of claim 8, wherein the controller is configured, when a plurality of synchronization requests are received by a plurality of the receivers during each of a plurality of responding time periods, to alternate according to a specified rate of alternation between causing the transmitter to transmit the response in reply to a synchronization request of the plurality of synchronization requests that was received by the first receiver, and causing the transmitter to transmit the response in reply to a synchronization request of the plurality of synchronization requests that was received on a subnet associated with a highest time quality of the subnets on which the plurality of synchronization requests were received.

11. Non-transitory computer readable media containing instructions which, when executed, cause a controller of a first node to:
   estimate a time quality of the first node, said time quality being a number indicating a degree of correspondence of the internal time base with an external reference time base;
   maintain a source table containing identities and time qualities of a plurality of source table nodes with which the first node is able to directly communicate via a network; and
   during a requesting time period:
   A) assign to the transmitter a subnet of the network that is associated with a highest time quality Tqh of the time qualities of the source table nodes, Tqh being higher than the time quality of the first node;
   B) assign to a first receiver of the plurality of receivers the subnet of the network that was assigned to the transmitter;
   C) assign to a second receiver of the plurality of receivers a subnet of the network that is associated with a next highest time quality Tqnh of the source table nodes, Tqnh being lower than Tqh, but higher than the time quality of the first node;
   D) cause the transmitter to transmit a synchronization request; and
   E) if one or more responses to the synchronization request are received from a corresponding one or more responding nodes by at least one of the plurality of receivers, improve the time quality of the first node according to the response received from the responding node having a highest time quality of the responding nodes.

12. The non-transitory media of claim 11, wherein the instructions are further configured to cause the controller to repeat steps D) and E) when a response to the synchronization request is not received.

13. The non-transitory media of claim 11, wherein the instructions are further configured, when no response to the synchronization request is received, to cause the controller to:
assign to the transmitter the subnet of the network that is associated with time quality Tqnh; and
repeat steps B) through E), where Tqnh is substituted in place of Tqh in step C).

14. The non-transitory media of claim 11, wherein the instructions are configured to cause the controller to control four receivers of the first node.

15. The non-transitory media of claim 11, wherein the instructions are configured to cause the controller to include four source table nodes in the source table.

16. The non-transitory media of claim 11, wherein:
the time qualities of the first node, the source table nodes, and the responding nodes are integer time qualities;
integer subnet numbers are assigned to the subnets of the network; and
each of the subnets is associated with the integer time quality that is equal to its integer subnet number.

17. The non-transitory media of claim 11, wherein the instructions are configured to cause the controller to control an exchange of data by a Joint Tactical Radio System (JTRS) Link 16 terminal with a Link 16 network.

18. The non-transitory media of claim 11, wherein the instructions are further configured to cause the controller, during a responding time period that is not the requesting time period, to:
I) assign to the transmitter and to the first receiver the subnet of the network that is associated with the time quality of the first node;
II) assign to the second receiver a subnet that is associated with a time quality that is higher than the time quality of the first node; and
III) transmit a response to a synchronization request that is transmitted by a second node and received by one of the plurality of receivers.

19. The non-transitory media of claim 18, wherein the instructions are further configured to cause the controller, when a plurality of synchronization requests are received during the responding time period by a same one of the receivers, a first of the synchronization requests being received before a remainder of the synchronization requests, to cause the transmitter to transmit a response to the first of the synchronization requests.

20. The non-transitory media of claim 18, wherein the instructions are further configured to cause the controller, when a plurality of synchronization requests are received by a plurality of the receivers during each of a plurality of responding time periods, to alternate according to a specified rate of alternation between causing the transmitter to transmit the response in reply to a synchronization request of the plurality of synchronization requests that was received by the first receiver, and causing the transmitter to transmit the response in reply to a synchronization request of the plurality of synchronization requests that was received on a subnet associated with a highest time quality of the subnets on which the plurality of synchronization requests were received.

* * * * *